United States Patent
Chen et al.

(10) Patent No.: US 8,955,457 B2
(45) Date of Patent: Feb. 17, 2015

(54) FEEDING METHOD AND FEEDING SYSTEM FOR FARMED FISH

(75) Inventors: Weimin Chen, Oita (JP); Toru Mitsuboshi, Saiki (JP)

(73) Assignee: Nippon Suisan Kaisha, Ltd. (JP)

( * ) Notice: Subject to any disclaimer, the term of this patent is extended or adjusted under 35 U.S.C. 154(b) by 227 days.

(21) Appl. No.: 13/263,151

(22) PCT Filed: Apr. 6, 2010

(86) PCT No.: PCT/JP2010/056257
§ 371 (c)(1),
(2), (4) Date: Nov. 22, 2011

(87) PCT Pub. No.: WO2010/117001
PCT Pub. Date: Oct. 14, 2010

(65) Prior Publication Data
US 2012/0055412 A1    Mar. 8, 2012

(30) Foreign Application Priority Data
Apr. 7, 2009   (JP) .................................. 2009-093112

(51) Int. Cl.
*A01K 61/02*    (2006.01)
(52) U.S. Cl.
CPC ..................... *A01K 61/02* (2013.01)
USPC ........................... 119/230; 119/51.04; 119/54
(58) Field of Classification Search
USPC .............................. 119/51.04, 51.11, 54, 230
See application file for complete search history.

(56) References Cited

U.S. PATENT DOCUMENTS

| 4,027,627 | A | * | 6/1977 | Fillion | 119/51.11 |
| 4,221,187 | A | * | 9/1980 | Casey | 119/232 |
| 4,399,769 | A | * | 8/1983 | Casey | 119/232 |
| 4,606,300 | A | * | 8/1986 | Sterner | 119/51.04 |
| 4,922,856 | A | * | 5/1990 | Sweeney, Jr. | 119/51.04 |
| 5,133,287 | A | * | 7/1992 | Hicks | 119/230 |
| 5,473,703 | A | * | 12/1995 | Smith | 382/143 |
| 6,000,362 | A | * | 12/1999 | Blyth et al. | 119/51.04 |
| 6,116,471 | A | | 9/2000 | Miller | |
| 6,443,098 | B1 | * | 9/2002 | Blyth et al. | 119/230 |
| 6,510,815 | B1 | * | 1/2003 | Lagardere | 119/230 |

FOREIGN PATENT DOCUMENTS

| CN | 2549733 | 5/2003 |
| CN | 201035351 | 3/2008 |
| ES | 2 107 330 A1 | 11/1997 |

(Continued)

OTHER PUBLICATIONS

International Search Report for Application No. PCT/JP2010/056257 mailed May 11, 2010 (2 pages).

(Continued)

*Primary Examiner* — Rob Swiatek
*Assistant Examiner* — Danielle Clerkley
(74) *Attorney, Agent, or Firm* — Harness, Dickey & Pierce, P.L.C.

(57) ABSTRACT

A method for feeding farmed fish by using au automatic feeder (20), which supplies a feed to the farmed fish in accordance with a preset feeding schedule, and a feed-demand sensor (22), which detects a demand for the feed by the farmed fish, characterized in that the feed-supply by the automatic feeder (20) is controlled on the basis of the detection results from the feed-demand sensor (22).

9 Claims, 9 Drawing Sheets

(56) References Cited

FOREIGN PATENT DOCUMENTS

| | | | |
|---|---|---|---|
| FR | 2 673 809 A1 | 9/1992 | |
| GB | 2221059 A * | 1/1990 | ............ A01K 61/02 |
| JP | 60-066927 | 4/1985 | |
| JP | 60-066927 A | 4/1985 | |
| JP | 63-145463 | 9/1988 | |
| JP | 2-227014 | 9/1990 | |
| JP | 04075544 A * | 3/1992 | ............ A01K 61/02 |
| JP | 4-126028 | 4/1992 | |
| JP | 4-304830 | 10/1992 | |
| JP | 5-252846 | 10/1993 | |
| JP | 05-252846 A | 10/1993 | |
| JP | 2898776 | 3/1999 | |
| JP | 2001-155571 | 6/2001 | |
| JP | 2002050269 A * | 2/2002 | ............ H01H 36/00 |

OTHER PUBLICATIONS

"Efficient Red Sea Bream Farming Using a Self Feeding Method", Fish Farming (Aqua Culture Magazine), Feb. 2009, pp. 5-8.
Chen, Wei-Min et al., "The Effect of Social Interactions on Circadian Self-Feeding Rhythms in Rainbow Trout Oncorhynchus Mykiss Walbaum", Physiology & Behavior 76 (2002), pp. 281-287.
Chinese Office Action for Application No. 2010-80015024.4 dated Oct. 18, 2013 with English translation (12 pages).
Lv Quan, "Principle and Application of Modern Sensor", Tsinghua University Press, Jun. 1, 2006, First Edition, pp. 304-307.
Extended European Search Report for Application No. EP 10 76 1700 dated Nov. 19, 2013 (6 pages).

* cited by examiner

|  | Step 1 | Step 2 |
|---|---|---|
| START TIME | 6:01 | 18:01 |
| END TIME | ... | ... |
| NUMBER OF FEEDS | 20 | 20 |
| QUANTITY OF FEED | 100g | 100g |
| SELF-ACTIVATED FEEDING OPERATION SUPPRESSION PERIOD | 2sec | 2sec |
| FEED INTERVAL | 300sec | 300sec |
| QUANTITY OF FEED PER UNIT TIME | 16.5g/s | |
| MAXIMUM QUANTITY OF FEED | 20,000g | |

| TEST SECTION | AUTOMATIC FEEDING | SELF-ACTIVATED FEEDING | COMBINATION |
|---|---|---|---|
| OVERALL QUANTITY OF FEED (kg) | 466.47 | 447.08 | 544.18 |
| AVERAGE INCREASE IN BODY WEIGHT (kg/fish) | 1.18 | 1.06 | 1.47 |
| FEED CONVERSION RATIO (FCR) | 2.09 | 2.13 | 1.80 |
| DEGREE OF VARIATION | 15.98 | 10.19 | 8.46 |
| PYLORIC APPENDAGE INDEX | 2.23* | 2.40* | 2.55* |

| TEST SECTION | HAND FEEDING | COMBINED FEEDING |
|---|---|---|
| OVERALL QUANTITY OF FEED (kg) | 14,000 | 16,600 |
| AVERAGE INCREASE IN BODY WEIGHT (kg/fish) | 0.566 | 0.627 |
| FEED CONVERSION RATIO (FCR) | 2.12 | 2.11 |
| DEGREE OF VARIATION | 11.7 | 10.0 |

| TEST SECTION | HAND FEEDING | COMBINED FEEDING |
|---|---|---|
| OVERALL QUANTITY OF FEED (kg) | 476 | 482 |
| AVERAGE INCREASE IN BODY WEIGHT (kg/fish) | 0.0737 | 0.0868 |
| FEED CONVERSION RATIO (FCR) | 1.19 | 0.97 |
| DEGREE OF VARIATION | 22.5 | 18.0 |

FIG. 8

| TEST SECTION | HAND FEEDING 1 | HAND FEEDING 2 | COMBINED FEEDING 1 | COMBINED FEEDING 2 |
|---|---|---|---|---|
| OVERALL QUANTITY OF FEED (kg) | 580 | 540 | 620 | 540 |
| AVERAGE INCREASE IN BODY WEIGHT (kg/fish) | 0.0807 | 0.0422 | 0.0875 | 0.0815 |
| FEED CONVERSION RATIO (FCR) | 2.01 | 2.33 | 1.67 | 1.60 |

FIG. 8

FEEDING METHOD AND FEEDING SYSTEM FOR FARMED FISH

CROSS-REFERENCE TO RELATED APPLICATION

This is a U.S. National Stage Application of International Application No. PCT/JP2010/056257, filed on Apr. 6, 2010 and published in the Japanese language as WO 2010/117001 A1 on Oct. 14, 2010. This application claims priority from Japanese Patent Application No. 2009-093112, filed on Apr. 7, 2009. The disclosures of the above applications are incorporated herein by reference.

TECHNICAL FIELD

The present invention relates to a feed supply method and feed supply system for farmed fish.

BACKGROUND

In the prior art, automatic feeding methods that supply feed to farmed fish in preset quantities and at preset times are well-known. While such methods do allow savings to be made the labor associated with feeding work, risk of underfeeding and overfeeding is high due to the difficulty of responding to changes in the appetite of the fish. Overfeeding not only reduces profitability, but is also a cause of pollution of the sea at the site of the farm. On the other hand, underfeeding slows the growth of the fish. Also well-known as methods that aim to supply a required and sufficient quantity of feed by supplying feed in response to self-activated demand from the fish are self-activated-type feeding methods (such Japanese laid-open patent application JPA 2001-155571). However, in the self-activated type feeding systems, the self-activation behavior of the fish ceases before they are full, and these methods therefore carry the risk that the fish will not grow sufficiently (see "Youshoku" (Fish Farming) February 2009 issue, pp 5 to 8). Also, when self-activated feeding demand method is used on groups of fish, it has been reported that only a specific limited number of the individual fish behave in a way that demands feeding (Physiology and Behavior 2002, Issue 76, pp 281 to 287), and there is therefore a risk that variations in the amount of feeding will occur within the group, resulting in a loss of feeding efficiency.

SUMMARY OF THE INVENTION

Problem to be Solved by the Invention

The present invention was conceived after considering the above-described issues, and has the object of providing a feeding method and feeding system for farmed fish that allow an appropriate quantities of feed to be supplied in appropriate time periods.

Means to Solve the Problem (1) The present invention is a feeding method for farmed fish using an automatic feeder that feeds in accordance with a preset feeding schedule and a feed demand sensor that detects feed demand from the farmed fish, wherein feed supplied from the automatic feeder is adjusted based on detection results from the feed demand sensor.

According to the present invention, a quantity of feed that is appropriate to the changing appetites of the fish is supplied by adjusting the supply of feed issued from the automatic feeder based on results from the feed demand sensor that detects feed demand from the farmed fish.

(2) Further, in the present invention, adjustment of the feed supplied from the automatic feeder may be at least one of stopping feeding, starting feeding, increasing a quantity of feed, and decreasing the quantity of feed.

(3) Further, in the present invention, the feed supplied from the automatic feeder may be adjusted when a number of detections per predetermined time period meets a predetermined condition.

According to the present invention, an appropriate quantity of feed can be supplied in response to changes in the appetite of the fish.

(4) Further, in the present invention, feed may be supplied from the automatic feeder at a fixed interval and the feed supplied from the automatic feeder may be adjusted based on detection results from the feed demand sensor during periods when feed is not being supplied.

According to the present invention, an appropriate quantity of feed can be supplied in response to changes in the appetite of the fish.

(5) The present invention is a feeding system including: an automatic feeder that supplies feed in accordance with a predetermined feeding schedule; a control apparatus that controls the automatic feeder; and a feed demand sensor that detects feed demand from farmed fish, wherein the control apparatus adjusts feed supplied from the automatic feeder based on detection results from the feed demand sensor.

Effect of the Invention

The present invention does not simply combine automatic feeding and self-activated feeding, but uses information from a feed demand sensor, which is used for the self-activated feeding, to adjust the feeding schedule of the automatic feeding. According to the present invention, feed supplied from the automatic feeder is adjusted based on detection results from a feed demand sensor that detects feed demand from the farmed fish, thereby allowing an appropriate quantity of feed to be supplied in response to changes in the appetite of the fish while preserving the advantages of supplying feed using the automatic feeder.

BRIEF DESCRIPTION OF THE DRAWINGS

FIG. 6 illustrates first test results for the feeding system of the present embodiment.

FIG. 9 illustrates fourth test results for the feeding system of the present embodiment.

DETAILED DESCRIPTION OF PREFERRED EMBODIMENTS

The following describes an embodiment of the present invention. Note that the present embodiment described below does not unduly limit the content of the invention recorded in the claims. Note also that the configurations described in the present embodiments are not necessarily the configurations of the essential element of the present invention.

1. Configuration

Figure 1:
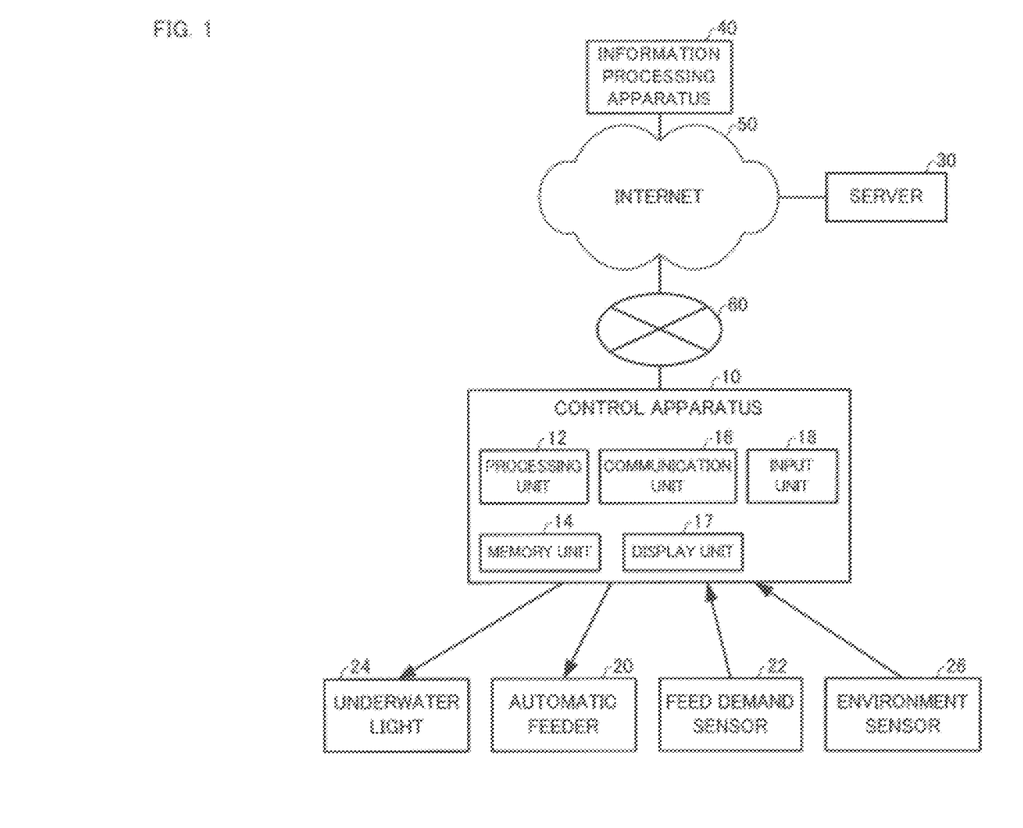
FIG. 1 illustrates an example configuration of a feeding system according to an embodiment.

FIG. 1 is an example configuration of the feeding system of the present embodiment.

The feeding system of the present embodiment includes an automatic feeder 20, a control apparatus 10 that controls the automatic feeder 20, a feed demand sensor 22, an underwater light 24, an environment sensor 26, a server 30, and an information processing apparatus 40 (personal computer (PC), cell phone capable of running a program or the like). The server 30 and the information processing apparatus 40 are connected via the Internet 50, the server 30 and the control apparatus 10 are connected via the Internet 50 and a wireless network 60.

The automatic feeder 20 is fixed to slats or the like over the fish cages and a screw conveyor is driven based on control signals from the control apparatus 10, thus conveying feed (pellets) from a feed box to an outlet and dropping the feed from the outlet to feed the fish.

Figure 2:
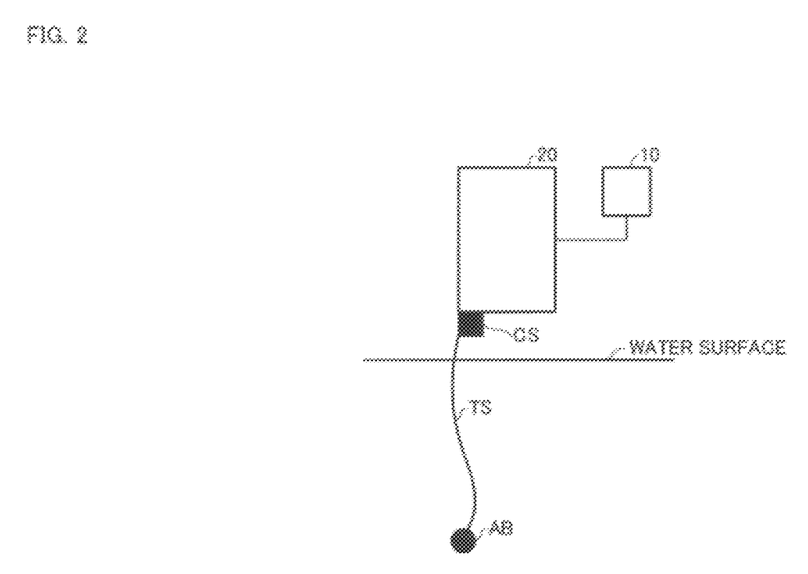
FIG. 2 describes an example of the feed demand sensor.

A feed demand sensor 22 detects feed demand from the farmed fish. In the present embodiment, as illustrated in FIG. 2, a contact switch CS is used as the feed demand sensor 22. An outer portion of the contact switch CS is fitted with a tetoron thread TS and fake feed AB resembling a pellet is attached to end of the tetoron thread TS below the water surface. If a farmed fish pulls on the fake feed AB, the contact switch CS operates, and a signal is outputted from the contact switch CS to the control apparatus 10. At the control apparatus 10, a judgment is made and reflected in the supply of feed from the automatic feeder 20. Note that the contact switch CS is simply a sensor that detects the feed demand from the farmed fish, and may be replaced with another sensor capable of detecting feed demand, such as an infrared sensor that optically detects fish behavior, a heat sensor that thermally detects fish behavior, a chemical detector that chemically detects fish behavior or the like.

The underwater light 24 is a device that emits light under the surface of the water as feed is supplied from the automatic feeder 20 to induce self-activated feeding by the farmed fish. Note that a device that emits sound or vibrations (vertical movements or the like) may be used instead of the underwater light 24.

The environment sensor 26 is a sensor that detects site water temperature, lighting, flow rate, dissolved oxygen concentrations and the like and outputs detected data to the control apparatus 10.

Although not illustrated, an underwater camera connected to the control apparatus 10 may be installed underwater, and information from the underwater camera may be viewed via the Internet. It is then possible to manage remotely by directly viewing the operating states of the feed demand sensor and the automatic feeder.

The server 30 functions as a web server and/or database, and provides the user with an interface for setting the preset feeding schedule (time, quantity and frequency of feeding, and the like) for the automatic feeder 20 and referring to the feed demand sensor 22 and environment sensor 26 measurement values transmitted from the control apparatus 10. Further, the server 30 transmits the setting information for the feeding schedule set by the user to the control apparatus 10. In other words, the user can remotely set the feed content for the automatic feeder 20 and refer to or download the demand sensor 22 and environment sensor 26 measurement values by accessing the server 30 using the information processing apparatus 40, which may be a PC or the like.

The control apparatus 10 includes a processing unit 12, a memory unit 14, a communication unit 16, a display unit 17 and an input unit 18.

The processing unit 12 performs various processing of the control apparatus 10 based on input information from the input unit 18, programs and the like. The functions of the processing unit 12 may be realized by using hardware such as a processor (CPU, DSP) of any of various types, including ASIC and the like, or by using a program.

Further, the processing unit 12 controls the automatic feeder 20 and the underwater light 24 based on the feeding schedule setting information received from the server 30, the signals outputted from the feed demand sensor 22, the program and the like. Specifically, the processing unit 12 outputs a control signal to the automatic feeder 20 so that feeding is performed by the automatic feeder 20 in accordance with the feeding schedule set by the user. Further, the processing unit 12 may be set to control the automatic feeder 20 so that a fixed quantity of feed is supplied from the automatic feeder 20 on every occasion that feed demand is detected by the feed demand sensor 22. Further, the processing unit 12 performs processing to store the measurement data outputted by the feed demand sensor 22 and the environment sensor 26 in the memory unit 14, and transmit the measurement data stored in the memory unit 14 to the server 30 via the communication unit 16.

Further, the processing unit 12 adjusts the supply of feed from the automatic feeder 20 by changing the settings information of the feeding schedule based on the detection results from the feed demand sensor 22. In other words, the feeding by the automatic feeder 20 may be stopped, started or controlled to increase or decrease in quantity based on the detection results from the feed demand sensor 22.

Further, the processing unit 12 may be set to adjust the feed supplied from the automatic feeder 20 when a number of detections per predetermined time period meets a predetermined condition. Here, the judgment of whether or not the number of detections has met the predetermined condition may be carried out based on whether or not the number of detections has reached a threshold value.

When the feed is being supplied at intervals from the automatic feeder 20, the processing unit 12 may also adjust the feed supplied from the automatic feeder 20 based on detection results from the feed demand sensor 22 during non-feeding periods.

The memory unit 14 stores programs, data and the like and provides work regions for the processing unit 12 and the communication unit 16. Such functions can be realized by memory (ROM or RAM).

The communication unit 16 performs various types of control for communication with the server 30. Such functions may be realized using hardware such as any of various types of processor, communication-use ASIC, or by using a program or the like.

The display unit 17 displays programs, data and the like before transmission to the server 30. Such functions may be realized using a liquid crystal display or the like. The user can refer to the data using the display unit 17 when a communication fault occurs, or it is necessary to work while viewing the situation on site.

The input unit 18 is a device to allow the user to enter data. Such a function may be realized using buttons, a keyboard, a touch-panel display or the like. Using the input unit 18, the user can input data when a communication fault occurs or it is necessary to work while viewing the situation on site.

2. Method of the Present Embodiment

Figure 3A:
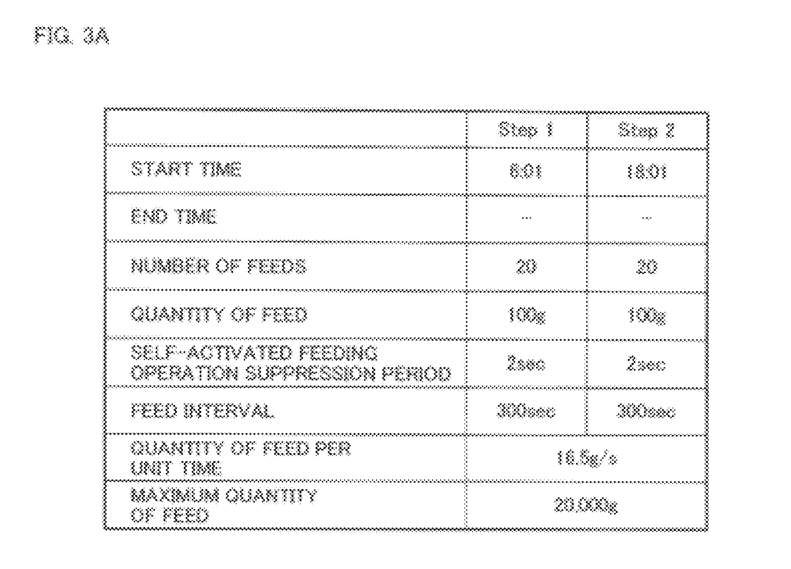
FIG. 3A illustrates an example of settings information for a feeding schedule.
Figure 3B:
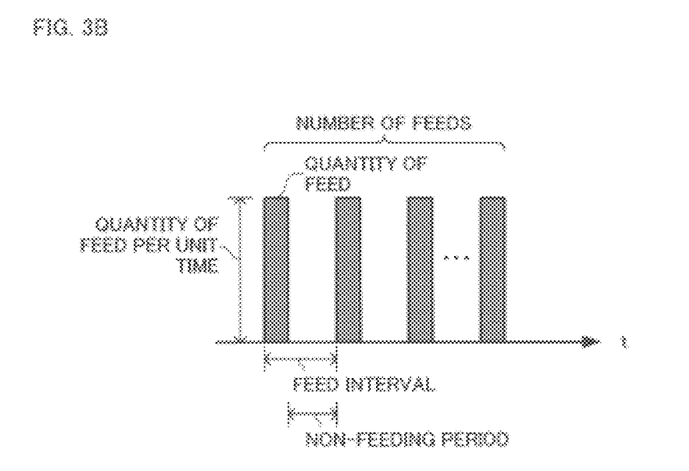
FIG. 3B describes settings items in the feeding schedule.

FIG. 3A is an example of setting information for the feeding schedule that can be set by the user in this embodiment, and FIG. 3B is a diagram for describing the settings items of the feeding schedule.

Here, "start time" is used to mean the start time of the feeding session over which feed is supplied from the automatic feeder 20. "End time" is used to mean the end time of the feeding session over which feed is supplied from the automatic feeder 20. When feed is supplied according to detection of feed demand by the feed demand sensor, the end time can be set to the time of the end of the response. By limiting the feed supply period in this way, the feed demand in the group of fish can be prevented from spreading excessively. Also, by limiting the number of feeds to a fixed number or less, overfeeding can be prevented when normal feeding efficiency has dropped due to an outbreak of disease, the occurrence of a red tide, or the like. Note that the "number of feeds" is the number of feeds in a feeding session (number of operations). Also "quantity of feed" is the quantity of feed per single feed.

Further, "self-activated feeding operation suppression period" is the time for which self-activated feeding (feeding in response to detection of feed demand by the feed demand sensor 22) is suppressed. In other words, feed is not supplied during the self-activated feeding operation suppression period subsequent to a previous self-activated feeding, even if a feed demand is detected by the feed demand sensor 22. By setting the feeding operation suppression period, the oversupply of feed can be prevented.

Further, "feed interval" is a time from the start of a feed to the start of the next feed. Further, "quantity of feed per unit time" is used to mean the quantity of feed supplied per unit time (feed distribution rate). Further, "maximum quantity of feed" is used to mean the maximum quantity of feed used in a single day. When the quantity of feed supplied in a single day reaches the maximum quantity of feed, operation of the automatic feeder is stopped.

It may also be made possible to set a "daily feeding rate". Here, "daily feeding rate" is used to mean a value obtained by dividing an overall quantity of feed supplied during the rearing period by the product of mid-period overall weight and a number of days of rearing, and expressing the result as a percentage. Here, the mid-period overall weight can be found by averaging an overall weight at the start of the rearing and an overall weight at the end of the rearing, but may also be estimated by appropriate sampling during the rearing period.

Thus, in the case that the feeding schedule is set as illustrated in FIG. 3A, feed is supplied daily by the automatic feeder 20 in two feeding sessions starting at start times of 6:01 and 18:01, each session including twenty lots of 100 g supplied at five minute intervals. In the feeding sessions, a fixed quantity of feed is supplied from the automatic feeder 20 in response to detection of a feeding demand by the feed demand sensor 22.

In the present embodiment, the supply of feed from the automatic feeder 20 is adjusted based on the detection results from the feed demand sensor 22. For, example, as illustrated in FIG. 3B, under the feeding schedule by which feed is supplied at intervals, if the number of detections (number of actions) by the feed demand sensor 22 is no more than a predetermined threshold value, the appetite of the fish during that session is judged to be low and the feeding schedule may be adjusted by stopping subsequent feeding. Alternatively, in this case, rather than stopping the feeding, the interval to the subsequent feeds may be lengthened in the feeding schedule, or the quantity of feed supplied per feed may be reduced in subsequent feeds. Further, the quantity of feed supplied in response to the detection of a feed demand by the feed demand sensor 22 may be reduced, and the self-activated feeding operation suppression period may be lengthened.

On the other hand, when the number of detections reaches a predetermined threshold value or higher, the appetite of the fish in that period is judged to be high, and the feeding schedule may be changed by shortening the feed interval for subsequent feeds or increasing the quantity of feed per feed in subsequent feeds. Also, if the feeding has been stopped, feeding in accordance with the feeding schedule may be restarted. Further, the quantity of feed supplied in response to detection of a feed demand from the feed demand sensor 22 may be increased and the self-activated feeding operation suppression period may be shortened.

Note that when the number of detections by the feed demand sensor 22 reaches the threshold value or higher, or the threshold value or lower, the feeding schedule may be changed immediately. Also, the number of detections by the feed demand sensor 22 may be stored and considered when changing the feeding schedule in following days.

Thus, according to the present embodiment, a constant quantity of feed can be supplied in accordance with the feeding schedule, and feed can be supplied in appropriate quantities, neither too much nor too little, and at the appropriate times by adjusting the feeding schedule in response to the appetite of the fish.

Further, in the feeding sessions, the number of detections by the feed demand sensor 22 may be measured over a predetermined period, and the number of detections per unit time (detection rate) calculated based on this information may be used to adjust the feed supplied from the automatic feeder 20. For example, when the predetermined period (time for measuring the detection rate) is set to 300 seconds and the number of detections in the preceding 300 seconds is 2, the detection rate is 0.4 times/second. Note that the number of detections over the preceding 300 seconds is stored in a shift register.

Figure 4:
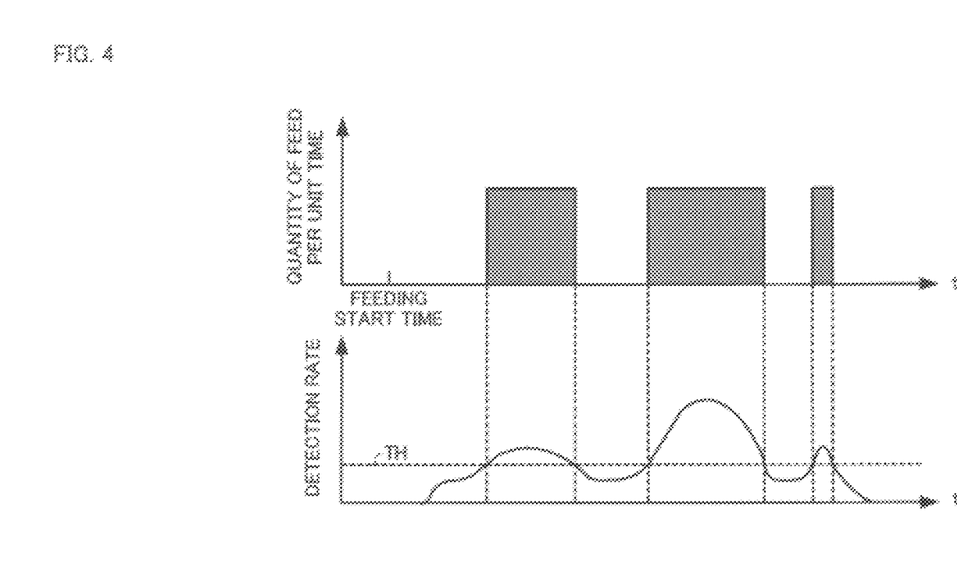
FIG. 4 describes an example of an adjustment to the feed supplied from the automatic feeder.

Then, as illustrated in FIG. 4, when the calculated detection rate exceeds a threshold value TH during a feeding session set in the feeding schedule, the feed supply is continued at the quantity of feed per unit time set in the feeding schedule. If the detection rate is equal to or less than the threshold value TH, the supply of feed is stopped. In this way, appropriate feeding can be performed in response to the appetite of the fish. Further, when the detection rate exceeds the threshold value TH, overfeeding can be prevented by supplying feed in the quantity of feed per unit time set in the feeding schedule, irrespective of the number of detections by the feed demand sensor 22.

Here, since the quantity of feed per unit time (maximum quantity of feed per unit time) is constant when the motor connected to the screw conveyor of the automatic feeder 20 is running, the control apparatus 10 controls the times that the motor is running and stopped so that the quantity of feed supplied is the quantity of feed per unit time set in the feeding schedule. For example, in a case in which the maximum quantity of feed per unit time is 3000 g/minute, the quantity of feed per unit time set in the feeding schedule is 147 g/minute, and a total cycle time of a single cycle, which is the sum of the time the motor is running and the time that the motor is stopped, is 20 seconds, the time that the motor is running in the cycle is 20 seconds×147/3000=0.98 seconds and the time that the motor is stopped is 20 seconds−0.98 seconds=19.02 seconds. Thus, the control unit 10 repeats a cycle of running the motor of the automatic feeder 20 for 0.98 seconds and stopping the motor for 19.02 seconds.

Note that the detection rate measurement period and the threshold value TH can be freely selected by the user. For example, by setting the threshold value TH to "−1", feed can be supplied in accordance with the feeding schedule over the entire feeding session, irrespective of the detection results from the feed demand sensor 22 (even if the detection rate is 0).

Figure 5A:
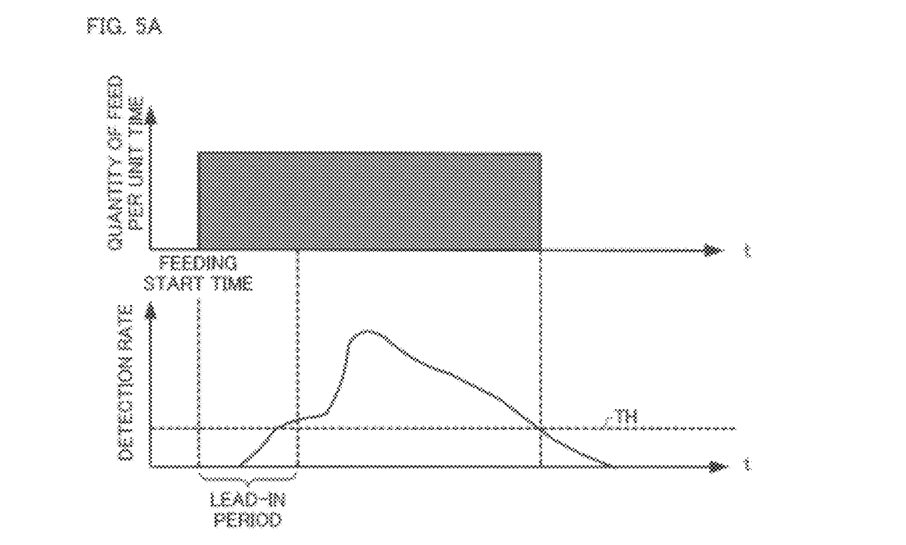
FIG. 5A describes an example of an adjustment to the feed supplied from the automatic feeder.
Figure 5B:
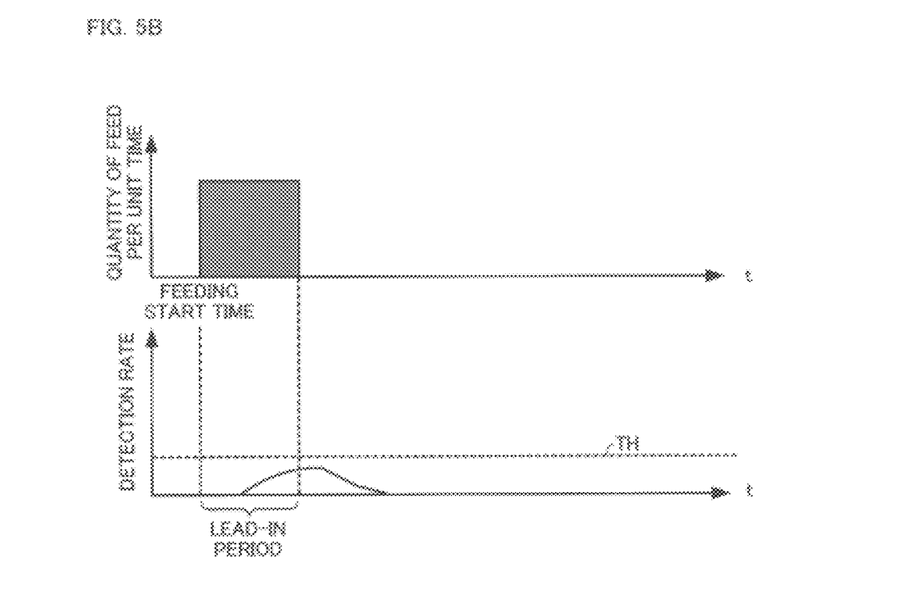
FIG. 5B describes an example of an adjustment to the feed supplied from the automatic feeder.

Further, as illustrated in FIGS. 5A and 5B, a period (lead-in period) may be set at the feeding start time during which the detection results (detection rate) from the feed demand sensor 22 are ignored and feeding is performed in accordance with the feeding schedule. By setting the lead-in period, the fish can be alerted that a feeding session has started and self-activated feeding can be induced. This is because it is considered that if the fish have empty stomachs at the feeding start time, they will approach the surface of the water and activate the feed demand sensor 22 as they eat the feed dropping from the automatic feeder 20.

In the example illustrated in FIG. 5A, the feed demand sensor 22 is turned on in the lead-in period and the detection rate exceeds the threshold value TH at the end of the lead-in period. Hence, after the end of the lead-in period, feeding continues until the detection rate falls below the threshold value TH.

On the other hand, in the example illustrated in FIG. 5B, the detection rate is lower than the threshold value TH at the end of the lead-in period, and so feeding ends when the lead-in period ends. Note that in the example of FIG. 5B, feeding is started if the detection rate exceeds the threshold value during the remainder of the feeding session.

Note that the lead-in period can be freely set by the user. For example, by setting the lead-in period to "0", as illustrated FIG. 4, it can be ensured that, after the start of feeding, feeding is not performed until the detection rate exceeds the threshold value TH.

When feeding farmed fish using such a feeding system, the system is preferably used on fish which recognize the feed demand sensor and have an established ability to learn. Fish which recognize the feed demand sensor and have an established ability to learn include yellowtail species such as young yellowtail and old yellowtail, amberjack species such as greater amberjack and yellowtail amberjack, horse mackerel species, sea bream species such as red sea bream, crimson sea bream, and silver sea bream, and trout and salmon species such as salmon and trout.

Feeding is preferably concentrated in periods when the feeding activity of the farmed fish is high, and the feeding sessions are preferably set once or twice daily, in the morning and/or the evening. To stimulate the feed demand of the fish and to enhance the learning of feed demand behavior, it is preferable that feeding is performed at the start of the period when feeding is possible so that the activation of the feed demand sensor by self-activated feeding is encouraged.

To improve feed efficiency, it is preferable to closely investigate feed demand from the fish and supply more feed at times when the feed demand is higher. To find times when feed demand is high, feeding by self-activated feeding can be set active for 24 hours at the beginning of the rearing. From the times of response from the feed demand sensor obtained in this way, it is possible to find when feed demand is high. By allowing self-activated feeding during these times, more feed can be supplied when feed demand is high. It is known that, in general, fish are most actively feeding around sunset and around sunrise, and so one or both of these times may be used as the time period for automatic feeding when rearing starts. The feeding schedule is appropriately modified to reflect the results of the self-activated feeding. However, the following conditions are an example of an arrangement at the starting point.

The overall quantity of feed is set to be 5.0% to 0.5% of the overall weight of the fish, and preferably 3.5% to 0.5% of the overall weight of the fish.

Depending on the type of fish, feeding time by automatic feeding is set at around sunrise and/or sunset.

Of the overall quantity of feed per day, 5% to 50%, preferably 10% to 40%, and even more preferably approximately 15% to 35% is supplied by automatic feeding with the remainder supplied by self-activated feeding.

The period of the automatic feeding is preferably 10 minutes to 60 minutes.

The quantity of feed per unit time in response to the feed demand sensor of the self-activated feeding is set to 50% to 200% of the quantity of feed per unit time of the automatic feeding.

The self-activated feeding may be active 24 hours a day, or, if the fish do not feed at night, be active only from sunrise to sunset. Further, if the feeding pattern is known, the self-activated feeding may be set active in accordance with the pattern, becoming active only when there is a large amount of feeding behavior.

When a limit is placed on a day's feeding session to suppress the noise that occurs due to changes in the external environment, such as changes in the wind and waves, the automatic feeding may be started at the start time of the feeding session, and the end time of the feeding session may be set to be at least 2 hours and preferably at least 1 hour from the end of the automatic feeding.

With a feeding schedule set within the above-described ranges, appropriate adjustments can be made based on subsequent detection results from the feed demand sensor. For example, if there is little response from the feed demand sensor after the automatic feeding and it is considered that the quantity of feed supplied by automatic feeding is too large, the quantity of feed supplied by automatic feeding can be reduced. For example, if there are many responses from the feed demand sensor after the automatic feeding and it is considered that the quantity of feed supplied by automatic feeding is too small, the quantity of feed supplied by automatic feeding can be increased.

Furthermore, while sampling appropriately, the quantity of feed supplied can be adjusted so that the daily feeding rate is from 5.0% to 0.5% and preferably from 3.5% to 0.5%.

3. WORKING EXAMPLE

Test Results 3-1. Working Example 1

FIG. 6 shows test results (working example 1) for the feeding system of the present embodiment.

Here, a total of 3 cages were prepared, including a cage for performing only automatic feeding in accordance with the feeding schedule (automatic feeding test section), a cage for performing only self-activated feeding using the feed demand sensor (self-activated feeding test section) and a cage for combining automatic feeding and self-activated feeding according to the method of the present embodiment (combined test section), 200 yellowtail were housed in each cage, and a test was performed for two months.

In the automatic feeding test section, feed was supplied in 200 g lots, a predetermined number of times (initially 60 times and subsequently 30 times) at 2 minute intervals every evening (initially 17:00 and subsequently 16:30), and adjusted so that that the daily feeding rate was 1.3% to 0.6% of the overall weight of the fish.

Further, in the self-activated feeding test section, a state was set whereby self-activated feeding (feed supplied in response to detection by the feed demand sensor 22) was allowed at any time over 24 hours, and a reward quantity (quantity of feed for a single activation of the feed demand sensor) was set to 200 g during the day and 50 g at night. Note that in the 4 days subsequent to the start of testing, feeding was performed by a combination of automatic feeding and self-activated feeding for the purpose of teaching the self-activated feeding.

Further, in the combined test section, a state was set whereby self-activated feeding (feeding in response to the detection of a feed demand from the feed demand sensor 22) was allowed at any time over 24 hours, and feeding was performed every day from the evening (initially 17:00 and subsequently 16:30) in 100 g lots in accordance with the feeding schedule. Note that in the combined test section, the number of feeds, feed interval and self-activated feeding operation suppression period of the feeding schedule were adjusted according to the detection results from the feed demand sensor 22. For example, the number of feeds was set to 30 initially and subsequently adjusted in the range of 10 to 70. Further, the feed interval was set to 60 seconds initially and subsequently adjusted to 80 seconds.

As illustrated in FIG. 6, an average body weight increase was largest in the combined test section. Further, although the overall quantity of feed was largest in the combined test section, the feed conversion ratio was smallest in the combined test section. In other words, in the combined test section, the fish grew larger and feeding was performed with greater efficiency than in either the automatic feeding test section or the self-activated feeding test section. Moreover, a degree of variation was smallest in the combined test section, showing that the fish grew uniformly in the combined test section. Further, no significant difference was observed in the pyloric appendage indices of the three test sections. The values were relatively low, which may be considered to mean that there was little fat buildup in the gut. Thus, from the test results shown in FIG. 6, it is clear that, overall, rearing results were best in the combined feeding test section.

3-2. Working Example 2

Figure 7:
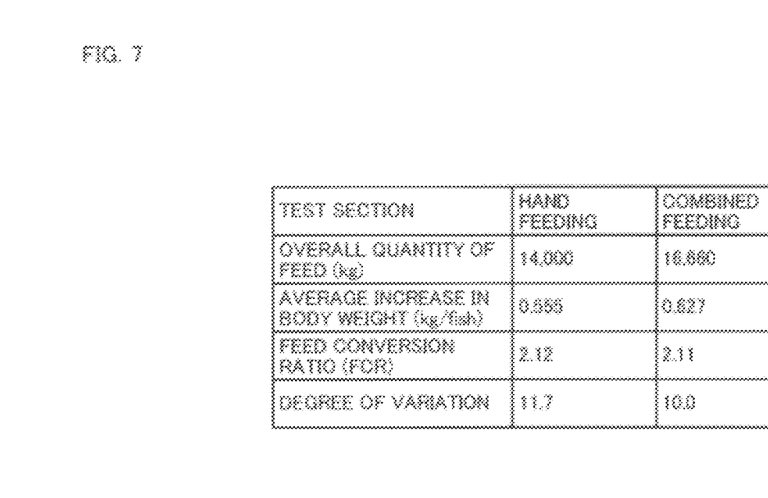
FIG. 7 illustrates second test results for the feeding system of the present embodiment.

FIG. 7 shows results from Working Example 2.

Here, two cages were prepared, including a cage for which hand feeding by a trained person (hand feeding section) was performed and a cage for which automatic feeding and self-activated feeding were combined according to the method of the present embodiment (combined test section). The cages of 10 m×10 m, the size of cages used in actual fish farming, housed 11908 fish and 12599 yellowtail respectively, and a test was performed for two months during a period of low water temperature. The hand feeding by a trained person is performed by finely adjusting the quantity of feed while observing the state of feeding at the water surface. Hence, the average increase in body weight was expected to be larger, and the feed conversion ratio and degree of variation was expected to be smaller than in the regular automatic feeding test section and self-activated feeding test section. In reality, in many fish farms where there is a ready supply of labor, hand feeding is used.

In the hand feeding section, feeding was performed 6 days a week at around 16:00 for approximately 20 minutes, and the daily feeding rate was adjusted to 2.9% to 1.8% of the overall weight of the fish.

Further, in the combined test section, in 2 hour sessions each evening (initially from 16:00, and subsequently from 16:30 and 17:00), a lead-in period of 2 minutes+10 minutes was set, induced feeding (automatic feeding) was performed for the first 2 minutes at a feeding rate (quantity of feed per unit time) of 1200 g/minute, and induced feeding was performed in the following 10 minutes at a feeding rate of 3600 g/minute. In the remaining 108 minutes, self-activated feeding (feeding in response to detection of feed demand by the feed demand sensor 22) was enabled. With the detection rate measurement period set to 1 minute and the threshold value of the detection rate (number of detections by the feed demand sensor 22 in the detection rate measurement period) set to 1 per minute, the feeding rate was set to 3600 g/minute or 3000 g/minute in accordance with the feeding schedule for only the periods when the detection rate exceeded the threshold value. As the water temperature dropped, the daily feeding rate was adjusted to 3.5% to 0.5% of the overall weight of the fish.

As illustrated in FIG. 7, the average increase in body weight was larger in the combined test section. Further, although the overall quantity of feed was larger in the combined test section, the feed conversion ratio of the combined test section was lower. In other words, in the combined test section, the growth of the fish was higher and the feeding was performed with greater efficiency than in the hand feeding section. Further, it is clear that, in the combined test section, the degree of variation was smaller and the fish grew in a uniform way. Thus, from the test results shown in FIG. 7, it is clear that, overall, rearing results in the combined test section were superior.

3-3. Working Example 3

Figure 8:
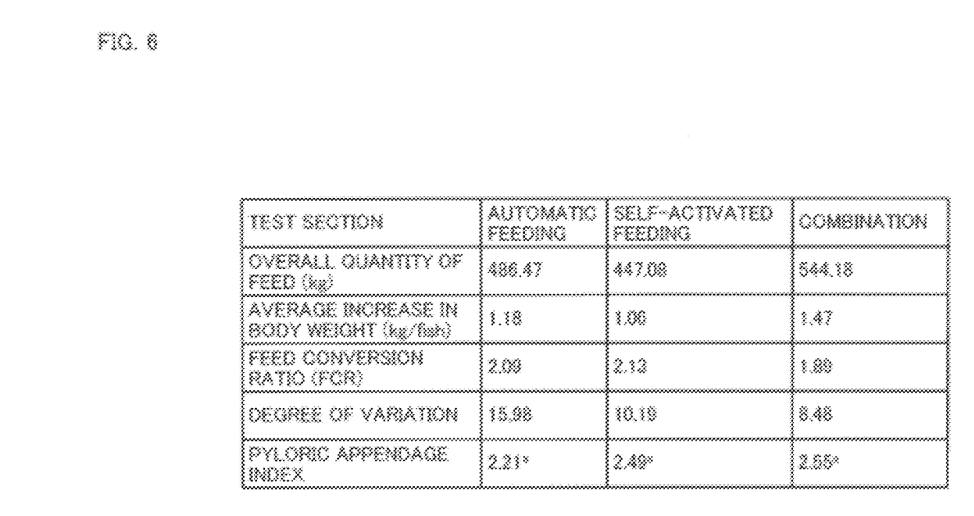
FIG. 8 illustrates third test results for the feeding system of the present embodiment.

FIG. 8 shows results from Working Example 3.

Here, to investigate whether similar effects could be obtained for other types of fish, two cages were prepared, including a cage for which hand feeding by a trained person (hand feeding section) was performed and a cage for which automatic feeding and self-activated feeding were combined according to the method of the present embodiment (combined test section). In each of the cages of 8 m×8 m, the actual size of the cages used in fish farming, 6450 greater amberjack fry were housed, and a test was performed for 37 days. In the hand feeding section, feeding was performed twice a day (8:00 and 14:00) for approximately 20 to 30 minutes, and the daily feeding rate was adjusted to 6.6% to 2.6% of the overall weight of the fish.

Further, in the combined test section, a state was set whereby self-activated feeding (feeding in response to the detection of a feed demand from the feed demand sensor 22) was allowed at any time over 24 hours, and feeding was performed every day in sessions from 6:01 to 8:00 and 17:01 to 19:00, feed being supplied in 100 g lots in accordance with the feeding schedule. During the night (19:01 to 6:00 the following day), the reward quantity for self-activated feeding was set to 5 g. Note that in the combined test section, based on the detection results from the feed demand sensor 22, the number of feeds in the feeding schedule is set to 20/day and the feed interval is maintained at 6 minutes, but the self-activated feeding operation suppression period is reduced from an initial time of 3 seconds to 2 seconds.

As illustrated in FIG. 8, the average increase in body weight was larger in the combined test section. Further, although the overall quantity of feed was smaller in the combined test section, the feed conversion ratio of the combined test section was lower. In other words, in the combined test section, the growth of the fish was higher and the feeding was performed with greater efficiency than in the hand feeding section. Further, it is clear that, in the combined test section, the degree of variation was smaller and that the fish grew in a uniform way. Thus, from the test results shown in FIG. 8, it is clear that, overall, rearing results in the combined test section were superior.

3-4. Working Example 4

FIG. 9 shows results from Working Example 4.

Here, to investigate whether similar effects could be obtained for other types of fish, a total of four cages were prepared, including two cages for which hand feeding by a trained person was performed (hand feeding section) and two cages for which automatic feeding and self-activated feeding were combined according to the method of the present embodiment (combined test section). In each of the cages of 8 m×8 m, which is the actual size of the cages used in fish farming, 5500 sea bream were housed, and a test was performed for approximately 1 month. In the hand feeding section, feeding was split between the morning and afternoon every day and performed until feeding behavior among the fish could no longer be seen, and the daily feeding rate was adjusted to 4.2% to 3.4% of the overall weight of the fish.

Further, in the combined test section, in daily sessions from 7:01 to 9:00 and from 17:01 to 19:00, a lead-in period of 6 minutes was set at the beginning of the session, and induced feeding (automatic feeding) was performed for the first 6 minutes at a feeding rate of 300 g/minute. The above-described feeding sessions except the induced feeding period and in the 9:01 to 17:00 period, self-activated feeding (feeding in response to detection of feed demand by the feed demand sensor 22) was enabled. The feeding rate was set to 300 g/minute in accordance with the feeding schedule for only the periods when the detection rate exceeded the preset threshold value. The daily feeding rate was adjusted to 3.4% to 2.3% of the overall weight of the fish.

As illustrated in FIG. 9, the average increase in body weight was larger in the combined test section. The feed conversion ratio was lower for the combined test section. In other words, in the combined test section, the fish grew larger and the feeding was performed with greater efficiency than in the hand feeding section. Thus, from the test results shown in FIG. 9, it is clear that, overall, rearing results in the combined feeding test section were superior.

What is claimed is:

1. A farmed fish feeding method comprising:
    providing an automatic feeder that periodically supplies feed to farmed fish in accordance with a preset feeding schedule;
    providing a control apparatus that controls the automatic feeder;
    providing a feed demand sensor that detects when a fish attempts to feed on fake feed; and
    automatically adjusting the preset feeding schedule with the control apparatus to change the feed supplied from the automatic feeder based on the feed demand detected by the feed demand sensor.

2. The method according to claim 1, wherein
    the adjusting of the preset feeding schedule includes adjusting at least one of a frequency of automatic feeding events, a duration of each automatic feeding event, and an interval between automatic feeding events.

3. The method according to claim 1, wherein
    the adjusting is performed after a number of detections per predetermined time period meets a predetermined condition.

4. The method according to claim 2, wherein
    the adjusting is performed after a number of detections per predetermined time period meets a predetermined condition.

5. The method according to claim 1, wherein
    the feed is supplied from the automatic feeder at a fixed interval, and
    the feed supplied from the automatic feeder is adjusted based on detection results from the feed demand sensor during periods when the feed is not being supplied.

6. The method according to claim 2, wherein
    the feed is supplied from the automatic feeder at a fixed interval, and
    the feed supplied from the automatic feeder is adjusted based on detection results from the feed demand sensor during periods when the feed is not being supplied.

7. The method according to claim 3, wherein
    the feed is supplied from the automatic feeder at a fixed interval, and
    the feed supplied from the automatic feeder is adjusted based on detection results from the feed demand sensor during periods when the feed is not being supplied.

8. The method according to claim 4, wherein
    the feed is supplied from the automatic feeder at a fixed interval, and
    the feed supplied from the automatic feeder is adjusted based on detection results from the feed demand sensor during periods when the feed is not being supplied.

9. A feeding system comprising:
    an automatic feeder that periodically supplies feed in accordance with a preset feeding schedule;
    a control apparatus that controls the automatic feeder; and
    a feed demand sensor that detects when a fish attempts to feed on fake feed,
    wherein the control apparatus adjusts the preset feeding schedule to adjust at least one of a frequency of automatic feeding events, a duration of each automatic feeding event, and an interval between automatic feeding events based on the feed demand detected by the feed demand sensor.

* * * * *